United States Patent [19]

Nishikawa et al.

[11] 4,211,686
[45] Jul. 8, 1980

[54] UNSATURATED POLYESTER RESIN COMPOSITION FOR USE IN PRESSURE MOLDING

[75] Inventors: Akio Nishikawa; Junichi Katagiri; Noriyuki Kinjo, all of Hitachi; Hitoshi Yokono, Katsuta; Tamotsu Ikeda, Hitachi; Tsuguo Kobayashi, Mito, all of Japan

[73] Assignee: Hitachi, Ltd., Japan

[21] Appl. No.: 767,322

[22] Filed: Feb. 10, 1977

[30] Foreign Application Priority Data

Feb. 12, 1976 [JP] Japan ................................ 51-13200

[51] Int. Cl.$^2$ ............................................. C08K 7/14
[52] U.S. Cl. ................................ 260/40 R; 260/42.53; 525/523
[58] Field of Search ...................................... 260/40 R

[56] References Cited

U.S. PATENT DOCUMENTS

| | | | |
|---|---|---|---|
| 3,326,845 | 6/1967 | Arens et al. | 260/40 R |
| 3,658,750 | 4/1972 | Tsukui et al. | 260/40 R X |
| 3,763,080 | 10/1973 | Deuter | 260/40 R X |
| 3,926,902 | 12/1975 | Bowen | 260/40 R |
| 3,936,414 | 2/1976 | Wright et al. | 260/40 R |
| 3,991,006 | 11/1976 | Chandler | 260/40 R |

FOREIGN PATENT DOCUMENTS

| | | |
|---|---|---|
| 1317975 | 1/1963 | France . |
| 1413988 | 9/1965 | France . |
| 2132474 | 11/1972 | France . |

*Primary Examiner*—Sandra M. Person
*Attorney, Agent, or Firm*—Craig & Antonelli

[57] ABSTRACT

An unsaturated polyester resin composition for use in pressure molding, which comprises an unsaturated polyester resin and fillers consisting essentially of (a) calcium carbonate powder which passes a 325 mesh sieve, (b) an inorganic mineral particulate which passes a 12 mesh sieve and is retained on a 200 mesh sieve and (c) glass fibers having a length larger than 0.2 mm, wherein the ratio by weight of (a) to (b) is within a range of from 0.3 to 10, the ratio of (a)+(b) to the unsaturated polyester resin is within a range of from 1.5 to 7, and the ratio of (c) to the total weight of the resin, calcium carbonate, silica sand and glass fiber is within a range of from 0.01 to 0.25.

19 Claims, No Drawings

UNSATURATED POLYESTER RESIN COMPOSITION FOR USE IN PRESSURE MOLDING

BACKGROUND OF THE INVENTION

The present invention relates to an unsaturated polyester resin composition suitable for pressure molding.

In recent years, unsaturated polyester resin compositions containing a reinforcing material such as glass fibers are used very widely in the field of electrical insulation, construction materials, etc. Such the compositions can provide cured articles having good mechanical strength, dimensional stability and electrical properties.

When the compositions are applied to the transfer or injection molding of inserts, these compositions have such problems that because of the orientation of glass fibers there occurs the separation between the resin and glass fibers during kneading and molding the composition.

There have been known a variety of resin compositions for use in structure materials, which comprise powdered fillers such as silica powder, clay, silica sand, calcium carbonate powder, etc.

U.S. Pat. No. 3,562,201 discloses in Example 3 a composition comprising an unsaturated polyester resin containing a catalyst (BPO), separators (zinc stearate and stearine), a polymerization inhibitor (hydroquinone), polystyrence powder, precipitated calcium carbonate powder, ground glass fiber, and an absorbent (very fine powder). The main advantage of the composition mentioned above is that by virtue of the absorption of liquid components of the resin by the absorbent, the composition has a reduced flow property under the normal condition and when a molding pressure is applied to the composition, the absorbed components flow out so that the flow properties of the composition are improved. The compositions described therein are useful for injection or extrusion molding, according to the patent specification.

U.S. Pat. No. 3,758,799 discloses a resin-filler composition comprising a filler which passes a 40 mesh sieve and is retained on a 100 mesh sieve. The composition comprises 65 to 80% by weight of the filler and 35 to 20% by weight of a resin. The composition may contain a glass fiber.

U.S. Pat. No. 3,658,750 discloses a thermosetting resin composition comprising a thermosetting resin, a coarse powder having a particle size of from 100 to 850 $\mu$m, and a fine powder having a particle size less than 60 $\mu$m. The composition has improved flow properties under pressure.

U.S. Pat. No. 3,763,080 discloses a moldable composition comprising an unsaturated polyester resin, a filler of 30 to 100 mesh and a separation inhibitor. This composition may contain a glass fiber. The specification says that since this composition has improved flow properties, it can flow into small cavities or interstices.

U.S. Pat. No. 2,890,914 discloses an electric machine such as motor, a stator of which is molded with a composition comprising an unsaturated polyester resin, a filler such as a powder of mica, silica or alumina, and glass fiber.

As disclosed in the U.S. Pat. No. 3,562,201, there have been known the compositions containing a powder of a thermoplastic resin in order to reduce the shrinkage of the composition upon the curing of it.

According to the investigations into the known compositions, it has been found that they have unsatisfactory molding characteristics when applied to transfer or injection molding of small sized devices.

When a composition contains only very fine fillers as disclosed in the U.S. Pat. No. 3,562,201, the viscosity of the composition becomes so high that a high molding pressure is needed. When the small sized devices include friable or fragile parts, the high pressure molding is not desirable.

On the other hand, when a resin composition contains only a coarse filler as disclosed in the U.S. Pat. No. 3,758,799, very fine cavities of the devices will not be sufficiently filled with the composition.

Although the U.S. Pat. No. 3,658,750 discloses a filler combination of a coarse filler and a fine filler, it is silent about fiber reinforcement. Further, in the patent specification only hard materials as a fine filler are exemplified. It has been found that when the hard fine filler is used, a glass fiber is ground and shortened so that the function for reinforcement by the glass fiber is lost.

The composition disclosed in the U.S. Pat. No. 3,763,080 contains only a coarse filler, which has the above mentioned drawback.

SUMMARY OF THE INVENTION

Accordingly, it is an object of the present invention to provide an unsaturated polyester resin composition having improved molding characteristics and being able to produce cured articles having good mechanical properties.

It is another object of the present invention to provide an unsaturated polyester resin composition characterized in that the composition contains a coarse filler having a particular particle size range, calcium carbonate powder as a fine filler and a glass fiber having a particular length range.

According to the present invention there is provided an unsaturated polyester resin composition comprising an unsaturated polyester resin, a finely divided calcium carbonate powder, inorganic mineral particulate having a particle size larger than that of the calcium carbonate powder, and a chopped glass fiber, wherein the ratio by weight of the calcium carbonate to the mineral particulate is within a range of from 0.3 to 10, the ratio of the total weight of the the calcium carbonate and the mineral particulate to the unsaturated polyester resin is within a range of from 1.5 to 7, preferably 2.5 to 6, and the ratio of the glassfiber to the total weight of the unsaturated polyester resin, the calcium carbonate, the mineral particulate and the glass fiber is within a range of from 0.01 to 0.25, preferably 0.1 to 0.2.

Other objects and features of the present invention will be apparent from the following description of the invention.

DETAILED DESCRIPTION OF THE INVENTION

In the present invention the filler combination of calcium carbonate powder and an inorganic mineral particulate such as silica sand powder is important. The calcium carbonate powder serves not only as a fine filler but also as a protecting powder for a glass fiber employed as a reinforcing material. Since calcium carbonate is not so hard as quantz glass powder and clay powder, it protects the glass fiber from its breakage during the kneading of the composition.

Silica sand is inexpensive and has a relatively small coefficient of linear thermal expansion so that a cured article having a small coefficient of linear thermal expansion is provided. As the mineral particulate powder of limestone can be used in the present invention.

When the ratio by weight of the calcium carbonate powder to the mineral particulate exceeds 10, mechanical strength of a cured article of the composition is not satisfactory because of insufficient filling of the small cavities of devices to be molded. Further, in case where the ratio is larger than 10, cracks occur in the cured articles.

On the other hand, when the ratio is less than 0.3, the viscosity of the composition becomes high so that fillingness of the small cavities of the devices will not be satisfactory.

When the ratio by weight of the total weight of the calcium carbonate powder and the mineral particulate to the unsaturated polyester resin is less than 1.5, a coefficient of linear thermal expansion becomes so large that the crack resistance of the cured articles will be lowered. Further, the resin separation during molding becomes excessive in the case of the small ratio.

When the ratio is larger than 7, the flow properties of the composition are lowered considerably and molding of such the composition under a low pressure is difficult. Further, bonding of the filler particulate by the resin is insufficient in the case of the large ratio.

When the ratio of the glass fiber to the total weight of the unsaturated polyester resin, calcium carbonate powder, mineral particulate and glass fiber is less than 0.01, the effectiveness of glass fiber is not expected; that is, the reinforcement of the cured article by the glass fiber is insufficient.

On the other hand, if the ratio exceeds 0.25, the composition becomes expensive and kneading and molding of such the composition are difficult.

Preferably, the ratio of the calcium carbonate to the mineral particulate should be within a range of from 0.3 to 4. The ratio of the total weight of the calcium carbonate powder and the mineral particulate to the polyester resin should preferably be within a range of from 2.5 to 7. Further, the ratio of the glass fiber to the total weight of the polyester resin, the calcium carbonate powder, the mineral particulate and glass fiber should preferably be within a range of from 0.1 to 0.2.

The mineral particulate includes silica sand and limestone powder. The words "silica sand" include a group of mineral materials which contain at least 70% by weight of silica. The silica sand is exemplified as follows: mountain sand, river sand, beach sand, etc. The form of particles of silica sand is not critical, but particles of globular form are preferable in order to maintain desired flow properties of the composition.

In the following, mesh numbers are referred to the U.S. mesh number.

River sand that is commercially available in Japan is classified into grades A-4, A-5, A-6 and A-7 and mountain sand is classified into grades N-40, N-50, N-60 and N-80. It was found that these sand materials had the following particle size distributions shown in Table 1. It should be noted, however, that the following distributions are merely shown as one example of a particle size distribution and that the distribution may be shown in another way. For example, the distributions may be shown by means of more finely divided mesh ranges.

Table 1

| Mesh range | River sand | | | | Mountain sand | | | |
| --- | --- | --- | --- | --- | --- | --- | --- | --- |
| | A-4 | A-5 | A-6 | A-7 | N-40 | N-50 | N-60 | N-80 |
| +12 mesh | — | — | — | — | 2% | — | — | — |
| −12 mesh + 32 mesh | 95% | 32% | 95% | 15% | 80% | 4% | — | 3% |
| −32 mesh + 60 mesh | 5 | 66 | 4.5 | 33 | 13 | 67 | 30% | 20 |
| −60 mesh + 100 mesh | — | 2 | 0.5 | 39 | 4 | 15 | 44 | 33 |
| −100 mesh + 150 mesh | — | — | — | 9 | 1 | 3 | 17 | 23 |
| −150 mesh + 200 mesh | — | — | — | 2 | — | 1 | 7 | 17 |
| −200 mesh + 325 mesh | — | — | — | — | — | — | 2 | 4 |

The term such as "−12 mesh +32 mesh" is meant that particles passes a 12 mesh sieve and are retained on a 32 mesh sieve.

The river sands of grades A-4, A-5, A-6 and A-7 are useful for the present invention because they have all a particle size range of 1410 to 74 μm. Among these preferable are grades A-4, A-5 and A-6. The grade A-7 contains particles relatively smaller than that of other grades.

The mountain sands of grades N-40, N-50 and N-60 are preferble for the present invention because at least 91% of them has a size range large than 105 μm. Since the grade N-80 contains a relatively large amount of fine particles, it is not necessarily useful for the present invention. Among the grades preferable are grades N-40 and N-50.

As an inorganic particulate, a powder of limestone ore is useful. This is produced by crushing and grinding a limestone ore whose main component is calcium carbonate. This limestone powder should have a particle size of about 1,500 to 100 μm.

The silica sand should have a particle size larger than that of calcium carbonate powder and preferably have a particle size within a range of from 74 to 1,500 μm. At least 95% by weight of the silica sand should pass a 12 mesh sieve and is retained on a 200 mesh sieve. More preferably, it should pass a 12 mesh sieve and be retained on a 150 mesh sieve so that the silica sand has a particle size range of from 1410 to 105 μm.

The calcium carbonate powder should be finely divided. Preferably, it should have a particle size less than 80 μm. More particularly, it should pass a 325 mesh sieve so that it has a particle size less than 44 μm. As a material for the calcium carbonate powder, a precipitated calcium carbonate powder or a finely divided limestone powder is used.

The chopped glass fiber should preferably have a length larger than 0.2 mm in the composition which has thoroughly been kneaded. More preferably, it should have a length of 0.2 to 8 mm. Particularly, the glass fiber having a length of 1 to 6 mm is suitable. When the length of glass fiber is less than 0.2 mm, a satisfactory reinforcing effect thereof is not expected. On the other hand, if the length is much larger than 8 mm, the composition will not flow sufficiently into small cavities of devices to be molded.

Even when the glass fiber has a large length such as 10 mm or more, before it is incorporated into the composition, it is shortened during kneading the composition. Therefore, long glass fibers can be used, provided that the length of the glass fibers in a kneaded composition is within such a range that the composition can be molded by means of an injection or transfer molding machine.

If the glass fiber has a large diameter, it becomes brittle and is easily broken during the kneading of the composition. Therefore, it should have a diameter less than 150 μm, preferably less than 50 μm. Glass fibers for use in molding compositions that are commercially available in Japan have a diameter of from 6 to 15 μm.

The unsaturated polyester resin employed in the present invention may include polycondensates or condensates synthesized from unsaturated or saturated polybasic acids, and anhydrides thereof, and hydroxyl compounds, and precursors thereof, in the presence or absence of a catalyst. When the term "unsaturated polyester resin" is used in the composition, it is used to mean a liquid mixture comprising the condensates, an ethylenically unsaturated compound such as styrene and a curing catalyst such as benzoyl peroxide. The liquid unsaturated polyester resin should preferably have a viscosity of 50,000 to 50 centipoises at 25° C.

Among the conventional unsaturated polyester resins preferable are vinylester resins synthesized from bisphenol A type epoxy compounds or novolac type epoxy compounds and methacrylate or acrylate.

Typical unsaturated and saturated polybasic acids, and anhydrides thereof, include maleic acid, maleic anhydride, fumaric acid, chloromaleic acid, dichloromaleic acid, methacoic acid, itacoic acid, adipic acid, sebacinic acid, phthalic acid, phthalic anhydride, isophthalic acid, pyrometritic acid, Het acid, etc.

Hydroxyl compounds, and precursors thereof include diols such as ethylene glycol, diethylene glycol, triethylene glycol, polyethylene glycol, propylene glycol, dipropylene glycol, trimethylene glycol, tetramethylene glycol, hexamethylene glycol, 2.2-diethylpropane diol-1.3, neopentyl glycol, bromoneopentyl glycol, bisphenol dioxyethyl ether, hydrogenated bisphenol A, 2.2-di(4-hydroxy propoxy phenyl) propane, ethyleneoxide, propylene oxide, 3.3.3-trichloropropylene oxide, phenylglycidyl ether, arylglycidyl ether, etc. Such polybasic acids as having three or more carboxylic groups may be used in combination with the dibasic acids. Similarly, polyhydroxyl compounds having three or more hydroxyl groups may be used in combination with the glycols.

Ethylenically unsaturated compounds admixed with the unsaturated polyester resin as a cross-linking agent include styrene, vinyl toluene, α-methyl toluene, divinyltoluene, diallylphthalate, chlorostyrene, dichlorostyrene, bromostyrene, dibromostyrene, diallylbenzene phosphonate, diallylarlyl phosphyl ester, acrylate ester, methacrylate ester, triallylcyanurate, tribromophenol allylether, etc. The ethylenically unsaturated compound may be contained in an amount of 20 to 50% by weight, preferably 30 to 45%, based on the weight of the mixture.

Curing catalysts for the polymerization reaction of the mixture of the unsaturated polyester resin and ethylenically unsaturated compound include 1.1-bis(butylperoxy)3.3.5-trimethylcyclohexane, benzoyl peroxide, parachlorobenzoyl peroxide, 2. 4-dichlorobenzoyl peroxide, capryl peroxide, lauroyl peroxide, acetyl peroxide, cyclohexanone peroxide, bis (1-hydroxycyclohexyl) peroxide, hydroxyheptyl peroxide, t-butylhydro peroxide, p-methanhydro peroxide, cumenhydro peroxide, 2.5-dimethylhexyl-2.5-dihydro peroxide, di-t-butyl peroxide, dicumyl peroxide, 2.5-dimethyl-2.5-di(t-butylperoxy) hexane, 2.5-dimethylhexyl-2.5-di(peroxy benzoate), t-butylperbenzoate, t-butylperacetate, t-butylperoctoate, t-butylperoxy butylate, di-t-butyl-perphthalate, etc.

If desired, conventional accelerators for the catalysts may be used which include lauryl mercaptan, N-butylsulfite, diphenylsulfite, p-toluenesulfonate, quaternary ammoniumsalts, β-diketones, peracetates of expoxy compounds, sulfonium salts, copper naphtate, vanadyl octoate, manganese naphtate, calcium naphtate, amines, phosphor compounds, sulfur compounds, etc.

Further, the composition may contain polymerization inhibitors for prolonging a pot life or shelf life thereof which include p-benzoquinone, naphtoquinone, phenanthraquinone, paraxyloquinone, 2.5-diphenyl-p-benzoquinone, 2.5-diacetoxy-p-benzoquinone, hydroquinone, p-t-butylcatecol, 2.5-di-t-butylhydroquinone, mono-t-butylhydroquinone, di-t-butyl-paracresol, hydroquinone monomethylether, alphanaphthol, etc.

According to the study of the composition it was found that a suitable amount of a diallyphalate prepolymer was useful for adjusting a viscosity of the composition. When the viscosity of a unsaturated polyester resin used in a composition is too small, the separation between the resin and fillers is excessive, whereby mechanical and electrical properties of cured articles are not satisfactory. An additive amount of the diallylphthalate prepolymer is within a range of from 1 to 10% by weight based on the total weight of the resin and the prepolymer itself. When the amount exceeds 10%, crack resistance of the cured articles is lowered. On the other hand, if the amount is less than 1%, an effect of the prepolymer is not expected. The prepolymer includes oligomers and prepolymers of diallylphthalate.

There are various kinds of additives including modifiers such as polybutadiene, polyethylene, polystyrene, phenol resins, melamine resins or urea resins; separators such as stearic acid, zinc stearate, calcium stearate, or polycrystalline wax; coupling agents such as vinyl silane, epoxy silane, or aminosilane; pigments such as titanic acid, titania, chromium oxide, minium, ferrous oxide, or carbon black; thixotropic agents such as silicate anhydride.

The present invention will be described in detail by reference to examples. It should be noted that the following examples are shown to illustrate the present invention, but are not shown to limit the scope of the present invention. Modifications and improvements of the examples will be made within the scope of the accompanying claims, without departing from the spirit of the invention.

EXAMPLE 1

The following composition was prepared which comprises 100 parts by weight of a vinyl ester resin synthesized from bisphenol A epoxy resin and methacrylate (6 poises, containing 40% styrene), 1 part of dicumyl peroxide (hereinafter referred to as DCPO for simplicity), 2 parts of zinc stearate as a separator (hereinafter referred to as Zn-St for simplicity), 1 part of methacryloxy propyltrimerritic acid as a coupling agent, 400 parts of river sand powder and calcium carbonate powder (passes a 325 mesh sieve, a mean particle size of 2.2 μm). The river sand powder had particle sizes shown in Table 1 and 25 parts of chopped glass fiber having 3 mm in length and 6 μm in diameter were added to the compositions. The composition was kneaded at room temperature by means of a roll kneader to obtain a desired unsaturated polyester resin composition.

With the compositions thus prepared, a cylindrical metallic insert of 30 mm in thinkness, 30 mm in inner diameter and 50 mm in outer diameter was molded by means of an inner liner type low pressure injection transfer molding machine under a pressure of 30 kg/cm² at 150° C. for 3 minutes. The insert had 24 holes of 1 mm in diameter, extending along the axis of the inert.

In Table 2, the fillingness of the holes with the cured resin and the appearance of the molded articles just after molding are shown.

Table 2

| Test No. | Particle size (μm) of silica sand | CaCO₃/Silica sand (by weight) | | | | | |
|---|---|---|---|---|---|---|---|
| | | 0/100 | 25/75 | 50/50 | 75/25 | 90/10 | 100/0 |
| 1 | 1410–500 (−12 mesh + 32 mesh) | × | ○ | ⊙ | ⊙ | ⊙ | Δ |
| 2 | 500–250 (−32 mesh + 60 mesh) | × | ○ | ⊙ | ⊙ | ⊙ | Δ |
| 3 | 250–105 (−60 mesh + 150 mesh) | × | ○ | ⊙ | ⊙ | ⊙ | Δ |
| 4 | 149–74 (−100mesh + 250 mesh) | Δ | ○ | × | ⊙ | ⊙ | Δ |
| 5 | 74–44 (−250mesh + 325 mesh) | Δ | ○ | × | ⊙ | ⊙ | Δ |
| 6 | less than 44 (−325 mesh) | Δ | ○ | × | × | × | Δ |

Note:
The term such as "−12 mesh + 32 mesh" is meant that the silica sand passes a 12 mesh sieve and is retained on a 32 mesh sieve.
× means unsatisfactory fillingness of holes and cracks observed.
Δ means cracks observed while fillingness of holes was sufficient.
○ means fillingness was sufficient and no crack observed.
⊙ means fillingness was satisfactory and no crack observed, and appearance excellent.

It is apparent from Table 2 that when the silica sands contain a large amount of small particles as in Test Nos. 4, 5 and 6, the fillingness and appearance of cured articles are not always good. However, it should be noted that the silica sand used in Test Nos. 4 and 5 are useful, when the ratio of the calcium carbonate powder to the silica sand is suitably chosen.

EXAMPLE 2

An unsaturated polyester resin composition was prepared which comprised 100 parts of an unsaturated polyester resin (6 poises), 1 part of DCPO, 2 parts of Zn-St, 1 part of the coupling agent used in Example 1, 25 parts of chopped glass fiber of 6 mm in length and 6 μm in diameter, calcium carbonate powder and silica sand (river sand). The unsaturated polyester resin was synthesized from isophthalic acid, maleic anhydride and propylglycol and contained 40% by weight of styrene. Amounts of the total weight of CaCO₃ and silica sand were varied as shown in Table 2 below, keeping the ratio of CaCO₃ to silica sand at 75/25.

A particle size of CaCO₃ was the same as that in Example 1, and the silica sand used passes a 12 mesh sieve and is retained on a 100 mesh sieve.

The compositions were kneaded by means of a roll kneader at room temperature to obtain desired unsaturated polyester resin compositions.

In Table 3, there are shown data with respect to the fillingness and appearance of molded articles in the same manner as in Example 1.

Table 3

| | Total amount of CaCO₃ and silica sand (parts by weight) | | | | |
|---|---|---|---|---|---|
| | 250 | 300 | 500 | 700 | 800 |
| Fillingness of holes | good | good | good | good | bad |
| appearance | no crack | no crack | no crack | no crack | cracks |

According to Table 3, it is said that when the ratio of CaCO₃ and silica sand to the resin is less than 7, the fillingness and appearance are good. It was found that there is a lower limit for the ratio, i.e. 1,5, to obtain molded articles having an impact value larger than 2 kg.cm/cm².

EXAMPLE 3

Unsaturated polyester resin compositions were prepared each of which comprises 90 parts by weight of an unsaturated polyester resin (6 poises, containing 40% by weight of styrene), 10 parts by weight of diallylphthalate prepolymer, 1 part of DCPO, 2 parts of Zn-St, 1 part of methacryloxy propyltrimethoxy silane (coupling agent), 5 parts of a thioxtropic agent (Erozyl), and fillers in amounts shown in Table 3 below.

The unsaturated polyester resin was synthesized from isophthalic acid, maleic anhydride and propylene glycol.

The compositions were kneaded at room temperature by means of a roll kneader. Cylindrical metallic inserts were transfer-molded with the compositions in the same manner as in Example 1, and the fillingness and appearance of molded articles are shown in Table 4 below.

Table 4

| Amount of glass fiber (parts by weight) (ratio) | Silica sand/CaCO3 (parts/parts) | Fillingness of holes | Appearance |
|---|---|---|---|
| 2.5 (0.005) | 198/189 | good | cracks |
| 5 (0.01) | 195/195 | good | no crack |
| 25 (0.05) | 188/188 | good | no crack |
| 50 (0.102) | 175/175 | good | no crack |
| 75 (0.15) | 163/163 | good | no crack |
| 100 (0.204) | 150/150 | good | no crack |

It is said from Table 4 that when the ratio of glass fiber to the total weight of the resin, CaCO$_3$, silica sand and glass fiber is less than 0.01, cracks may occur in the molded articles and that when the ratio is of from 0.01 to 0.2, good molded articles are obtained.

EXAMPLE 4

The following composition was found to have well balanced molding characteristics and to produce molded articles having good mechanical properties.

| | | | |
|---|---|---|---|
| (I) | Unsaturated polyester resin (a vinylester of a bisphenol A type epoxy resin and methacrylate, containing 30% by weight of styrene, 600 centipoises at 25°C.) | 95 | parts by weight |
| | DCPO | 1 | |
| (II) | (a) calcium carbonate powder (−325 mesh) | 190 | |
| | (b) river sand (−12 mesh + 100 mesh) | 185 | |
| | (c) glass fiber (6 mm length, 9 μm diameter) | 50 | |
| (III) | diallyphthalate prepolymer | 5 | |

In the above composition, ratios by weight of the respective components are as follows:

(a)/(b)=1, (a)+(b)/I=4, (c)/[I]+[II]=0.1, and

[III]/[I]+[III]=0.05

The glass fiber was shortened during kneading of the composition. It was found that the length of the glass fiber in the kneaded composition was about 1 to 5 mm.

EXAMPLE 5

The following composition was prepared in the same manner as in Example 1 which comprised: 100 parts by weight of the unsaturated polyester resin used in Example 4
1 part of DCPO
2 parts of Zn-St (separator)
1 part of methacryloxy propyltrimethoxy silane (coupling agent)
150 parts of calcium carbonate powder (−325mesh)
202.5 parts of limestone powder (=32 mesh+100 mesh)
45 parts of glass fiber (6 mm in length, 9 μm in diameter)

The above composition showed good molding characteristics and gave molded article having good crack resistance. It is speculated that since both calcium carbonate powder and limestone powder are not hard and protect the glass fiber from the shortening thereof, the reinforcing function of the glass fiber is remained after the composition has been kneaded thoroughly.

What we claim is:

1. An unsaturated polyester resin composition for use in pressure molding, which comprises:
    (I) a liquid mixture comprising an unsaturated polyester resin of a polycondensate or condensate synthesized from an unsaturated or saturated polybasic acid or anhydrides thereof, and hydroxyl compounds, or precursors thereof, an ethylenically unsaturated compound monomer in an amount of 20 to 50% by weight, based on the mixture, and a curing catalyst in an amount effective for the polymerization reaction between the polyester resin and the compound monomer, said mixture having a viscosity of 50 to 50,000 centipoises at 25° C., and
    (II) a filler consisting essentially of,
        (a) a calcium carbonate powder,
        (b) a silica sand having a particle size larger than said powder and smaller than 1500 μm and
        (c) a chopped glass fiber wherein the ratio by weight of (a) to (b) is within a range of from 0.3 to 10, the ratio of (a) and (b) to (I) is within a range of from 2.5 to 6, and the ratio of (c) to the total weight of (I) and (II) is within a range of from 0.01 to 0.25.

2. An unsaturated polyester resin composition according to claim 1, wherein said calcium carbonate powder has a particle size less than 80 μm.

3. An unsaturated polyester resin composition of claim 2, wherein said silica sand has a particle size of from 100 to 1,500 μm.

4. An unsaturated polyester resin composition according to claim 1, wherein said hydroxyl compound, or precursors thereof, is selected from the group consisting of ethylene glycol, diethylene glycol, triethylene glycol, polyethylene glycol, propylene glycol, dipropylene glycol, trimethylene glycol, tetramethylene glycol, hexamethylene glycol, 2,2-diethylpropane diol-1,3, neopentyl glycol, bromoneopentyl glycol, bisphenol dioxyethyl ether, hydrogenated bisphenol A, 2,2-di(4-hydroxy propoxy phenyl) propane, ethyleneoxide, propylene oxide, 3,3,3-trichloropropylene oxide, phenylglycidyl ether, and arylglycidyl ether.

5. An unsaturated polyester resin composition according to claim 4, wherein said unsaturated or saturated polybasic acid, or anhydride thereof, is selected from the group consisting of maelic acid, maelic anhydride, fumaric acid, chloromaleic acid, dichloromaleic acid, methacoic acid, itacoic acid, adipic acid, sebacinic acid, phthalic acid, phthalic anhydride, isophthalic acid, pyrometritic acid, and Het acid.

6. An unsaturated polyester resin composition according to claim 3, wherein said chopped glass fiber has a length of from 0.2 to 8 mm. in the kneaded composition.

7. An unsaturated polyester resin composition according to claim 6, wherein the filler has:
    (a) a calcium carbonate powder which passes a 325 mesh sieve, and
    (b) a silica sand powder which passes a 12 mesh sieve and is retained on a 200 mesh sieve.

8. An unsaturated polyester resin composition according to claim 7, wherein the silica sand powder passes a 12 mesh sieve and is retained on a 100 mesh sieve.

9. An unsaturated polyester resin composition according to claim 6, wherein the particle size of said calcium carbonate powder is less than 44 μm.

10. An unsaturated polyester resin composition according to claim 6, wherein the ratio of (a) to (b) is within a range of from 0.3 to 4.

11. An unsaturated polyester resin composition according to claim 6, wherein the ratio of (c) to the total weight of [I] and [II] is within a range of from 0.1 to 0.2.

12. An unsaturated polyester resin composition according to claim 6, wherein the composition further contains a diallylphthalate prepolymer in an amount of 1 to 10% by weight based on the total weight of [I] and the diallylphthate prepolymer.

13. An unsaturated polyester resin composition comprising:
   (I) a liquid mixture comprising an unsaturated polyester resin of a polycondensate or a condensate synthesized from an unsaturated or saturated polybasic acid, or anhydrides thereof, and hydroxyl compounds, or precursors thereof, an ethylenically unsaturated compound reactable with said unsaturated polyester resin, and a curing catalyst for the reaction therebetween, said mixture having a viscosity of 50 to 50,000 centipoises at 25° C.; and
   (II) a filler consisting essentially of,
      (a) a calcium carbonate powder which passes a 325 mesh sieve,
      (b) an inorganic mineral particulate which passes a 12 mesh sieve and is retained on a 150 mesh sieve, and
      (c) a chopped glass fiber having a length of from 0.2 to 8 mm, wherein the ratio of weight of (a) to (b) is within a range of 0.3 to 4, the ratio of (a) and (b) to (I) is within a range of from 2.5 to 6, and the ratio of (c) to the total weight of (I) and (II) is within a range of from 0.1 to 0.2.

14. An unsaturated polyester resin composition according to claim 13, wherein the composition further contains a diallylphthalate prepolymer in an amount of 1 to 10% by weight based on the total weight of [I] and the diallylphthalate prepolymer.

15. An unsaturated polyester resin composition according to claim 13, wherein the mineral particulate is a powder of limestone.

16. An unsaturated polyester resin composition as in claim 13, wherein the mineral particulate is silica sand.

17. An unsaturated polyester resin composition comprising:
   (I) a liquid mixture comprising an unsaturated polyester resin synthesized from methacrylate and a bisphenol A type epoxy compound, styrene monomer in an amount of 30 to 45% by weight based on the total weight of the resin and styrene, and a curing catalyst; and
   (II) a filler consisting essentially of,
      (a) a calcium carbonate powder which passes a 325 mesh sieve,
      (b) a silica sand powder which passes a 12 mesh sieve and is retained on a 100 mesh sieve, and
      (c) a chopper glass fiber having a length of from 1 to 6 mm in the kneaded composition, wherein the ratio by weight of (a) to (b) is within a range of from 0.3 to 10, the ratio of (a)+(b) to (I) is within a range of from 1.5 to 7, and the ratio of (c) to the total weight of (I) and (II) is within a range of from 0.1 to 0.2.

18. An unsaturated polyester resin composition according to claim 17, wherein the composition further contains a diallylphthalate prepolymer in an amount of 1 to 10% by weight based on the total weight of [I] and the diallylphthalate prepolymer.

19. An unsaturated polyester resin composition for use in injection molding, which comprises:
   (I) a liquid mixture comprising an unsaturated polyester resin of a vinylester of a bisphenol A epoxy resin, about 30% by weight of styrene, and a curing catalyst,
   (II) a filler consisting essentially of,
      (a) a calcium carbonate powder which passes a 325 mesh sieve,
      (b) a silica sand powder which passes a 12 mesh sieve and is retained on a 100 mesh sieve, and
      (c) a glass fiber having a length of 1 to 5 mm, and
   (III) a diallylphthalate prepolymer, wherein (a)/(b) by weight is about 1, (a)+(b)/(I) is about 4, (c)/(I)+(II) is about 0.1, and (III)/(I)+(III) is about 0.05.

* * * * *